Sept. 18, 1951     M. S. DUNKELBERGER     2,567,926

TUBULAR SUPPORTING MEMBER

Filed March 1, 1946

INVENTOR.
MILTON S. DUNKELBERGER
BY
HIS ATTORNEYS

Patented Sept. 18, 1951

2,567,926

UNITED STATES PATENT OFFICE 2,567,926

TUBULAR SUPPORTING MEMBER

Milton S. Dunkelberger, Dayton, Ohio

Application March 1, 1946, Serial No. 651,395

5 Claims. (Cl. 128—294)

This invention relates to a device to facilitate manipulation of rubber members and more particularly to a device that may be utilized in starting the insertion of a rubber tubular member having a closed end upon a member of the human body.

When a rubber finger-stall is to be applied to a finger or when a rubber tubular member is to be applied to the human body member for prophylactic or hygienic purposes, great difficulty is encountered in the application of the rubber member.

An object of this invention is to provide a support for a flexible tubular member having a closed end and adapted to be rolled upon the support, the support holding the rolled portion of the tubular member while the closed end portion of the tubular member is unrolled over into position to facilitate the handling thereof.

Another object of this invention is to provide a support for a tubular member having a closed end, which tubular member may have a portion rolled upon itself so as to form an annular roll adapted to be supported upon a cup-shaped support, which support may be used in displacing a portion of the tubular member, which displaced portion may be subjected to a test.

Other objects and advantages reside in the construction of parts, the combination thereof and the mode of operation as will become more apparent from the following description.

Referring to the drawings, Figure 1 is a longitudinal cross sectional view showing a flexible tubular member having a closed end and a roll portion supported upon a supporting member.

Figure 1:
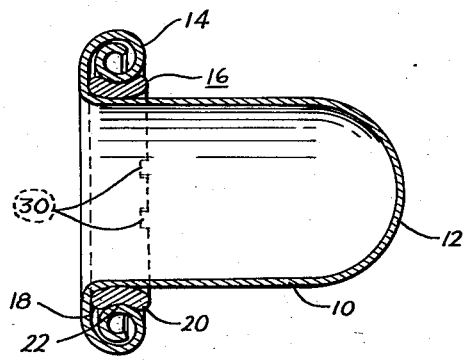
Figure 2:
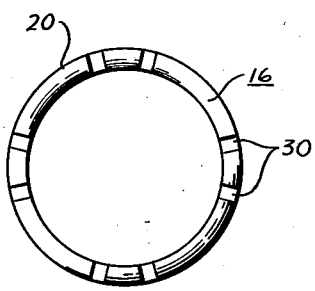
Figure 2 is a side elevational view of the support showing indentations used for the purpose of identification.

In the drawings, the reference character 10 indicates a rubber tubular member provided with a closed end 12. The open end of member 10 before use is generally rolled or coiled into a ring. These rubber members may be shipped, packed and stored in this condition. In the past, when using the rubber member, the member of the body to be covered has its end inserted against the closed end of the rubber member and then the member is unrolled, so as to be stretched over the member of the body to be protected. This is oftentimes a difficult manipulation, for the reason that when rolling the rubber, the rolled portion is not easily stretched.

To facilitate insertion of the member of the body, the rubber member may be partially unrolled and the coil or roll 14 of the rubber member rolled upon a ring or supporting member 16. This ring 16 may be made from metal, plastic molding material or any other suitable material, having the required rigidity. In Figure 1, the roll portion has been shown schematically at 14. In this particular figure only a small number of the convolutions have been shown. In actual use the roll portion may consist of a large number of convolutions. Furthermore, in this figure the thickness of the rubber member has been greatly exaggerated, for convenience in drawing. As is well known to those skilled in the art, these rubber members, especially if used for prophylactic purposes, are extremely thin and of light weight.

Figures 3, 4:
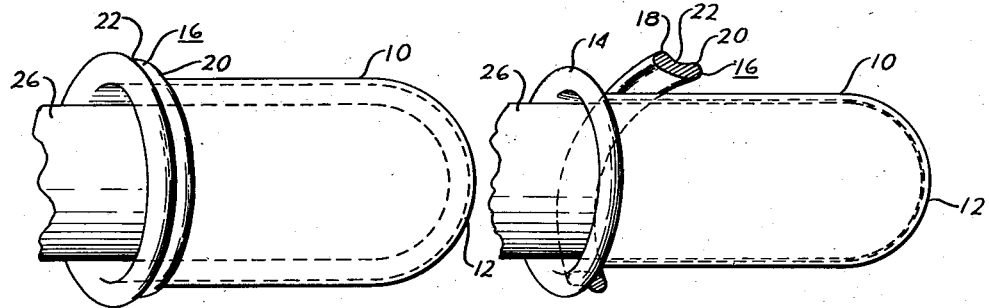
Figure 3 is a perspective side elevational view with the supporting ring in position.
Figure 4 is a view similar to Figure 3 but showing the supporting ring partially removed and in section.

The ring or supporting member 16 has a pair of rib-like marginal portions 18 and 20, cooperating to form an annular groove 22 that is concave in cross sectional area, as clearly seen in Figures 1 and 4. This annular groove forms a seat for the rolled rubber. A portion of the member of the body to be protected has been shown schematically at 26. The end of member 26 is projected into the tubular member 10, having the roll 14 supported upon the ring 16, as shown in Figure 3.

As may be seen in Figure 4, the roll 14 is rolled or stripped of the ring 16, so that the ring 16 may be removed and the balance of the rubber member rolled upon the member of the body to be protected. As may be clearly seen in Figure 4, the tubular rubber member 10 has been unrolled over and beyond the tapered or curved end portion of the member to be protected, so as to permit easy unrolling of the portion of the rubber forming the roll 14. The ring or supporting member 16 forms a temporary support for the roll 14 of the rubber member 10.

As may be clearly seen in Figures 1, 3 and 4, the rubber member 10 extends through the ring 16 and the coil 14 is so positioned on the ring 16 that the roll portion of the rubber member may be unrolled from the supporting member 16. In order to facilitate unrolling of the rubber member, the rubber member must project through the ring or supporting member 16 and the exposed portion of the ring 16 directed towards the closed end 12 of the rubber member 10.

In order to provide identification marks that may be felt, any suitable indentations or irregularities, such as notches 30, may be cut or formed in the rib 20, that is, the exposed rib of the supporting member. These irregularities or identification marks may be felt by touching the ring or supporting member 16. The member of the human body should enter the ring from the side opposite the identification marks so as to position the rubber member 10 upon a member of the human body, without the member of the body being visible.

Due to the fact that the rubber member is made from flimsy, light weight material, and due to the fact that the rubber member may be used in association with delicate tissues, all surfaces of the ring 16 are preferably highly polished, so as to present a smooth surface that is not likely to injure the rubber member or the member of the body. A slight hole in the rubber member may defeat its usefulness.

It has been recommended by medical authorities to test the rubber members for leaks and defects when intended for prophylactic or hygienic use. In the modification disclosed in Figure 5, a supporting member for the rubber member has been shown, which supporting member may also be used as a testing member. In this modification a tubular cup-shaped member 32 is provided with a pair of parallel ribs 34 and 36, located on opposite sides of an annular groove 38. The ribs 34 and 36, together with the annular groove 38, correspond with the ribs 18 and 20 and the annular groove 22, shown in connection with the preferred embodiment.

Figure 5:
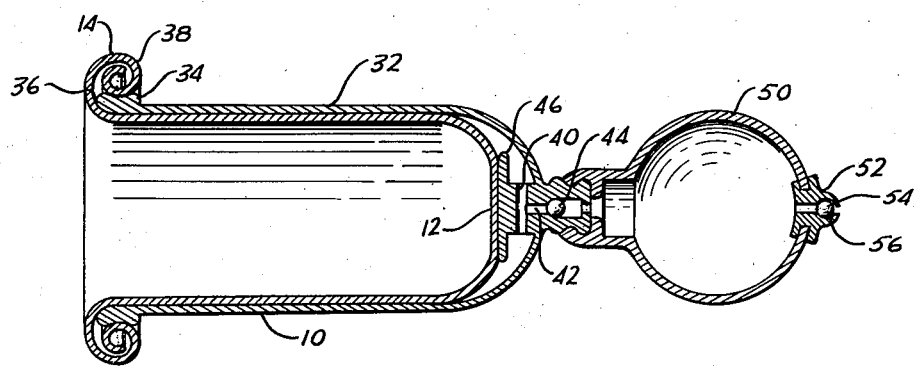
Figure 5 is a cross sectional view of a modification.

A bulbous suction device has been shown for withdrawing air from member 32. This suction device includes a plurality of radially disposed apertures 40, registering with a longitudinally disposed aperture 42, provided with a check valve 44 that may consist of a ball. An annular disc-like member 46 is positioned in the bottom of the closed end of member 32. A rubber bulb 50 is provided with a valve member 52, having a ball 54 used in closing an aperture 56. The ball 54 is positioned in the valve member 52 mounted in a suitable aperture in the bulb 50 opposite the aperture extending into member 32. The rubber member 10 has the roll 14 positioned in the annular groove or recess 38 after it has been sufficiently unwound, so as to leave a portion of the rubber member 10 available for positioning in the cup-shaped member 32. After the roll 14 has been positioned in the recess 38, the bulb 50 may be actuated, so as to pump the air out of member 32, creating a vacuum between members 10 and 32. The disc-like member 46 prevents the end 12 of the tubular rubber member from obstructing the air passages used in creating the vacuum. Obviously, the rubber member 10 will be drawn into the cup-shaped cavity, as shown in Figure 5, and remain in this position unless the rubber member 10 has defects or apertures in the end thereof. If it has defects, air will leak through the defective parts, so as to permit the portion of member 10 projecting into the cup-shaped cavity to collapse, thereby indicating to the user that the tubular member is defective.

When it is desirable to use the rubber member 10, the member of the human body to be protected is inserted into the portion of the tubular member located in the cup-shaped cavity. When the member of the body has been properly positioned, the roll 14 is rolled over the rib 36, so as to remove the roll portion 14 from the support, at which time the cup-shaped member may be withdrawn and the balance of the rubber member rolled upon the member of the body.

Throughout the specification and claims the rubber member has been referred to as having a closed end. The device herein could be used for a rubber member having an open end, as for example, it could be used in connection with an elastic hose or leg protector, used by victims of varicose veins.

Furthermore, "ring," as used herein, need not necessarily be a round ring; but could be a polygonal member having a peripheral seat for the roll of the rubber member.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A device for use in testing and applying a rubber tubular member having a closed end upon an external member of the human body, said device including a cup-shaped member having the margin provided with a pair of externally disposed annular ribs cooperating to form an annular recess for supporting a rolled portion of the rubber member to be tested, and means for exhausting the air from the space between the cup-shaped member and the closed end of the rubber member so as to cause the closed end of the rubber member to snugly fit the interior of the cup-shaped member to thereby test the rubber member for leaks and to provide a support for the rubber member to aid the application of the rubber member to a member of the body.

2. A device for use in applying a rubber tubular member having a closed end upon an external member of the human body, said device including a cup-shaped member, the margin of the cup-shaped member being provided with an annular seat for supporting a roll formed from a portion of the rubber member, so as to permit the closed end of the rubber member to be positioned within the cavity of the cup-shaped member to facilitate the application of the rubber member upon a member of the body.

3. A device for use in testing and applying a rubber tubular member having a closed end upon an external member of the human body, said device including a cup-shaped member, the margin of the cup-shaped member being provided with an annular seat for supporting a roll formed from a portion of the rubber member, so as to permit the closed end of the rubber member to be positioned within the cavity of the cup-shaped member, and means for exhausting the air from the space between the cup-shaped member and the closed end of the rubber member so as to cause the closed end of the rubber member to snugly fit the interior of the cup-shaped member to thereby test the rubber member for leaks and to provide a support for the rubber member to aid its application.

4. In a device for use in testing and applying a rubber tubular member having a closed end upon an external member of the human body, the combination including a cup-shaped member having an opening surrounded by the margin of the cup-shaped member, said cup-shaped member being provided with an aperture in the bottom thereof, the margin of the cup-shaped member providing a support for a roll formed from a portion of the rubber member, the closed end of the rubber member extending over the opening of the cup-shaped member, and means for exhausting the air from the space between the cup-shaped member and the closed end of the rubber member, said means including a bulbous suction pump exhausting the air through the aperture in the bottom of the cup-shaped member.

5. In a device for use in testing and applying a rubber tubular member having a closed end upon an external member of the human body, the combination including a cup-shaped member having an opening surrounded by the margin of the cup-shaped member, said cup-shaped member being provided with an aperture in the bottom thereof, the margin of the cup-shaped member providing a support for a roll formed from a portion of the rubber member, the closed end of the rubber member extending over the opening of the cup-shaped member, means for exhausting the air from the space between the cup-shaped member and the closed end of the rubber member, said means including a bulbous suction pump exhausting the air through the aperture in the bottom of the cup-shaped member, and a baffle-like plate mounted in spaced relation from the bottom of the cup-shaped member so as to prevent the closed end of the rubber member from sealing the aperture while exhausting the air to test the rubber member.

MILTON S. DUNKELBERGER.

REFERENCES CITED

The following references are of record in the file of this patent:

UNITED STATES PATENTS

| Number | Name | Date |
| --- | --- | --- |
| 1,389,531 | Riche | Aug. 30, 1921 |
| 1,868,269 | Beadle | July 19, 1932 |
| 2,101,875 | Scheicher | Dec. 14, 1937 |

FOREIGN PATENTS

| Number | Country | Date |
| --- | --- | --- |
| 111,720 | Austria | Dec. 27, 1928 |

OTHER REFERENCES

Pages 13 and 14 of "A New Method for the Profession," published in 1934 by the Gee Bee Company, 184 W. Main Street, Waterbury, Conn. A copy of the publication in question is available in Div. 55 of the U. S. Patent Office.